United States Patent
Hutchins (12)

(10) Patent No.: US 6,201,722 B1
(45) Date of Patent: Mar. 13, 2001

(54) INTER-BAY BIPOLAR DC BUS LINK

(75) Inventor: Michael Hutchins, Beaconsfield (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/585,899

(22) Filed: Jun. 2, 2000

(51) Int. Cl.[7] .............................. H02M 1/10; H01B 5/02
(52) U.S. Cl. ........................................ 363/144; 174/133 B
(58) Field of Search .......................... 363/144; 174/71 B, 174/72 B, 133 B; 361/724, 611, 637, 648

(56) References Cited

U.S. PATENT DOCUMENTS

| | | | |
|---|---|---|---|
| 2,262,067 | 11/1941 | Togesen et al. | 174/95 |
| 2,738,446 | 3/1956 | Fleming | 317/119 |
| 2,871,285 | 1/1959 | Fouse et al. | 174/72 |
| 2,992,291 | 7/1961 | Kussy | 174/88 |
| 3,742,121 | 6/1973 | Schmidt | 174/72 B |
| 3,961,129 | 6/1976 | Gehrs et al. | 174/72 B |
| 3,995,103 | 11/1976 | Gehers et al. | 174/72 B |
| 5,172,310 | * 12/1992 | Deam et al. | 363/144 |
| 5,422,440 | 6/1995 | Palma | 174/133 B |
| 6,024,589 | 2/2000 | Hahn, IV et al. | 439/212 |

* cited by examiner

*Primary Examiner*—Jessica Han
(74) *Attorney, Agent, or Firm*—Coudert Brothers

(57) ABSTRACT

The dead space at the top or bottom of a power converter bay or cabinet is used for the interconnection of the DC buses of adjacent bays by securing to the DC buses a pair of brackets which between them form a channel into which a linking bus having two conductor bars laminated together and separated by an insulating layer can be longitudinally slipped and fastened. The structure of the invention makes use of the dead space in a power converter bay and also permits interconnection of DC buses while the circuit is live.

6 Claims, 4 Drawing Sheets

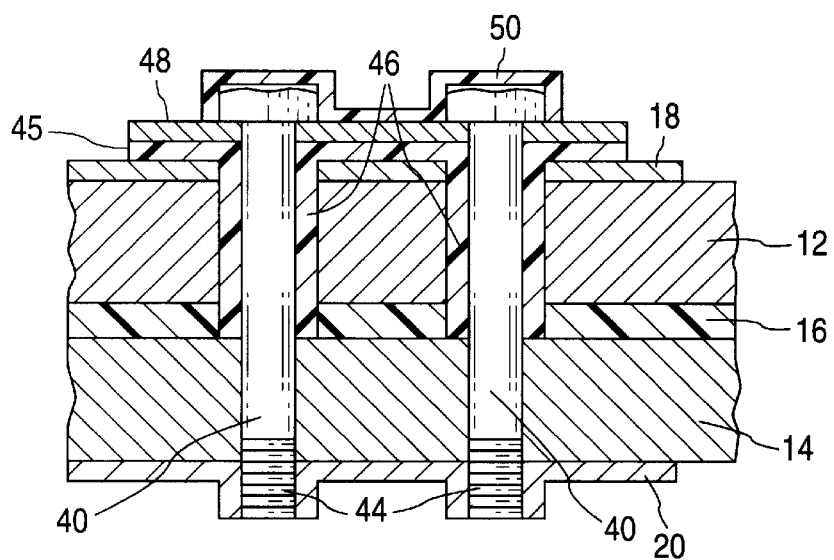
FIG. 3
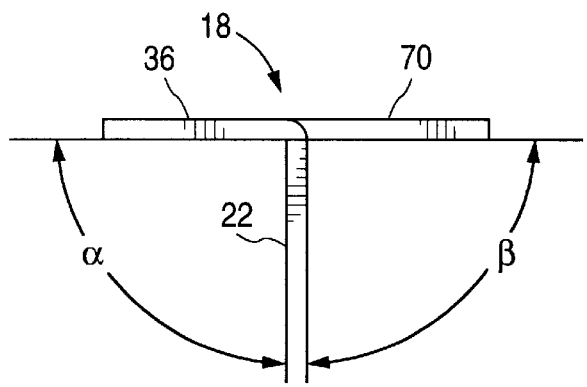
FIG. 4a
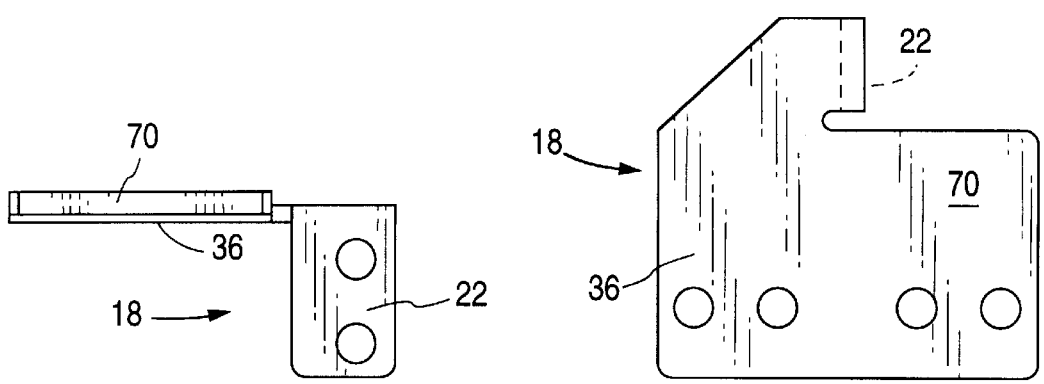
FIG. 4b   FIG. 4c

INTER-BAY BIPOLAR DC BUS LINK

FIELD OF THE INVENTION

This invention relates to DC bus links interconnecting the DC buses of adjacent power converter equipment bays, and more particularly to a bipolar link which is easily installed on live buses as equipment bays are added to a system to provide additional power.

BACKGROUND OF THE INVENTION

DC power for large facilities such as mainframe computers or large communications equipment is customarily provided by a large number of individual power converters mounted in equipment racks or bays and connected in parallel. In one embodiment of such equipment bays, the DC outputs of the converters in a given bay are connected to a vertical bipolar bus, i.e., a pair of copper bars separated by an insulator that run vertically along one side of the bay.

Typically, equipment bays for power converters are mounted in cabinets and include a small dead space above and below the converter equipment that can be used for AC cabling. In bottom-cabled bays, the top dead space is empty; in top-cabled bays, the empty dead space is at the bottom.

In the prior art, the "hot" and ground DC buses of adjacent bays were individually connected by separate linking buses bolted to the DC buses of the bays. Because these linking buses had to be mounted one above the other in order to be accessible for installation, they did not fit into the cabling space and therefore took away the space for at least one converter.

As a facility grows, more bays have to be provided in order to power the additional equipment. In order to utilize all available equipment space, yet continue connecting all the bays in parallel, it is desirable to provide simple, high-current rigid links that do not take away any equipment space, reside within the cabinet's footprint, and can be easily installed. It is also desirable to be able to do the installation without interrupting power to the facility, i.e., on a live circuit.

SUMMARY OF THE INVENTION

The present invention fills the above-described need by providing a bipolar linking bus composed of a pair of parallel conductor bars laminated together and separated by an insulator strip, and a set of mounting brackets that can be pre-assembled with the DC buses of a newly added bay in the dead space of the bay above or below the converter equipment. The linking bus can then be slipped through openings in the bay walls and into the receptacles formed by the brackets. The linking bus can be easily fastened to the brackets to form a sturdy link with high current-carrying capacity.

BRIEF DESCRIPTION OF THE DRAWINGS

FIG. 3 is a fragmentary enlarged vertical section along line 3—3 of FIG. 2;

FIGS. 4a–c are front, side and top views of the upper bracket; and

DESCRIPTION OF THE PREFERRED EMBODIMENT

Figure 1:
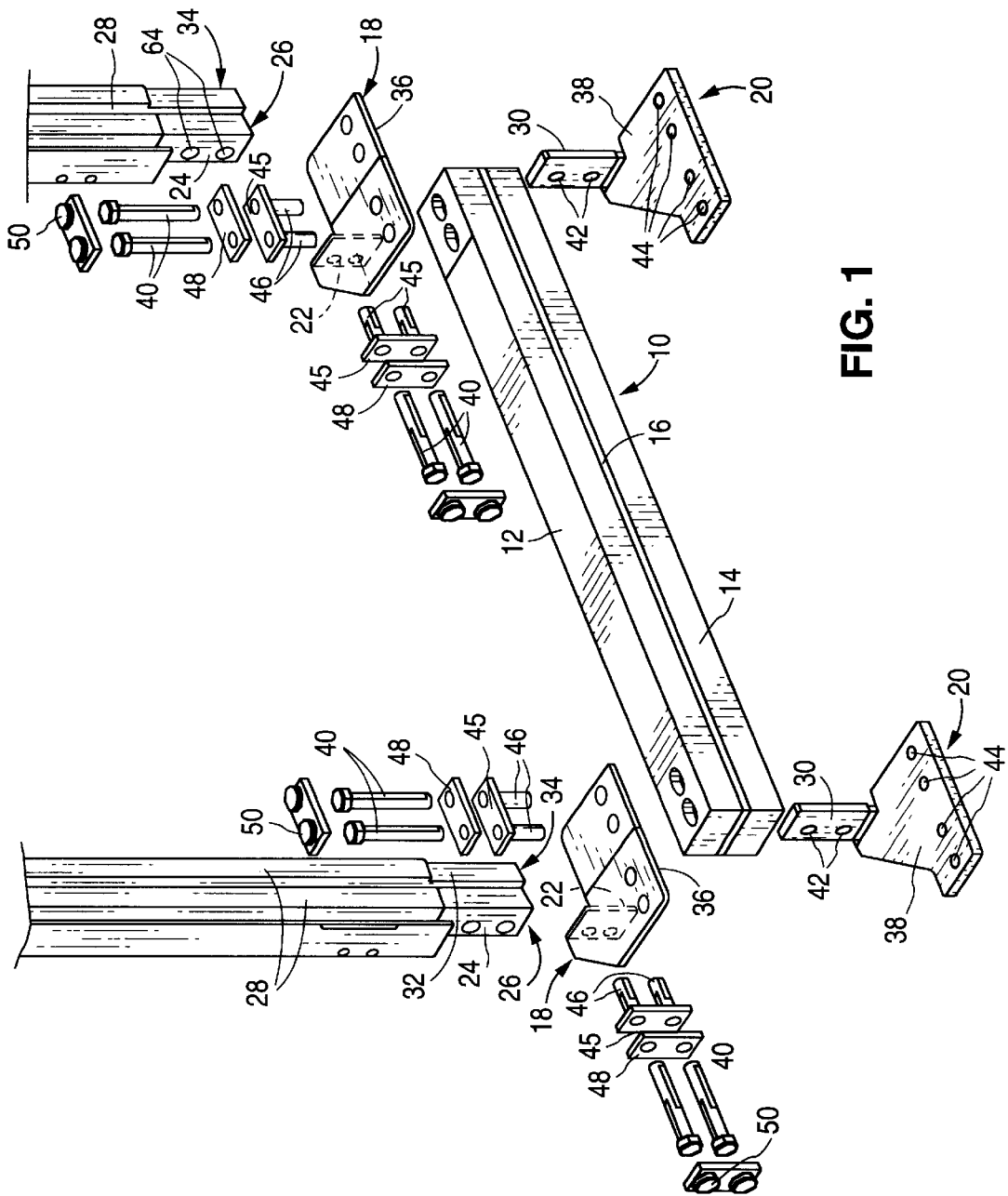
FIG. 1 is a perspective exploded view of the invention.

FIG. 1 shows the components of the inventive apparatus. A linking bus 10 is composed of two copper bars 12, 14 laminated with an insulating sheet 16. Each end of the linking bus 10 interacts with an upper bracket 18 and a lower bracket 20. The brackets 18, 20 are typically made of thick copper and are so dimensioned that when the downwardly extending ear 22 of the upper bracket 18 is secured to the end 24 of a DC bus 26 protruding from the insulating cover 28, and the upwardly extending ear 30 of the lower bracket 20 is secured to the end 32 of a DC bus 34, the surfaces 36, 38 of the brackets 18, 20 form a channel for receiving an end of the linking bus 10.

The brackets 18, 20 are secured to the DC buses 26, 34 and to the linking bus 10 by bolts 40. For this purpose, the openings 42 and 44 of the lower bracket 20 are preferably screwthreaded. The bolts 40 are slipped through an insulating plate 45 and sleeves 46 that extend through the DC bus 26 and the upper linking bar 12 to prevent short-circuiting contact between the bolts 40 and the DC bus 26 or bar 12. Load-distributing lock washers 48 may be used to secure the bolts 40 against vibrational disengagement. An insulating cover 50 is preferably applied over the heads of bolts 40 to prevent accidental contact between the bolts 40 and the bus 26 or bar 12 by a metallic tool or the like. It will be understood that instead of threading the openings 42, 44, the bolts 40 may extend in length beyond the bracket 20 and secured by correspondingly threaded nuts.

Figure 2:
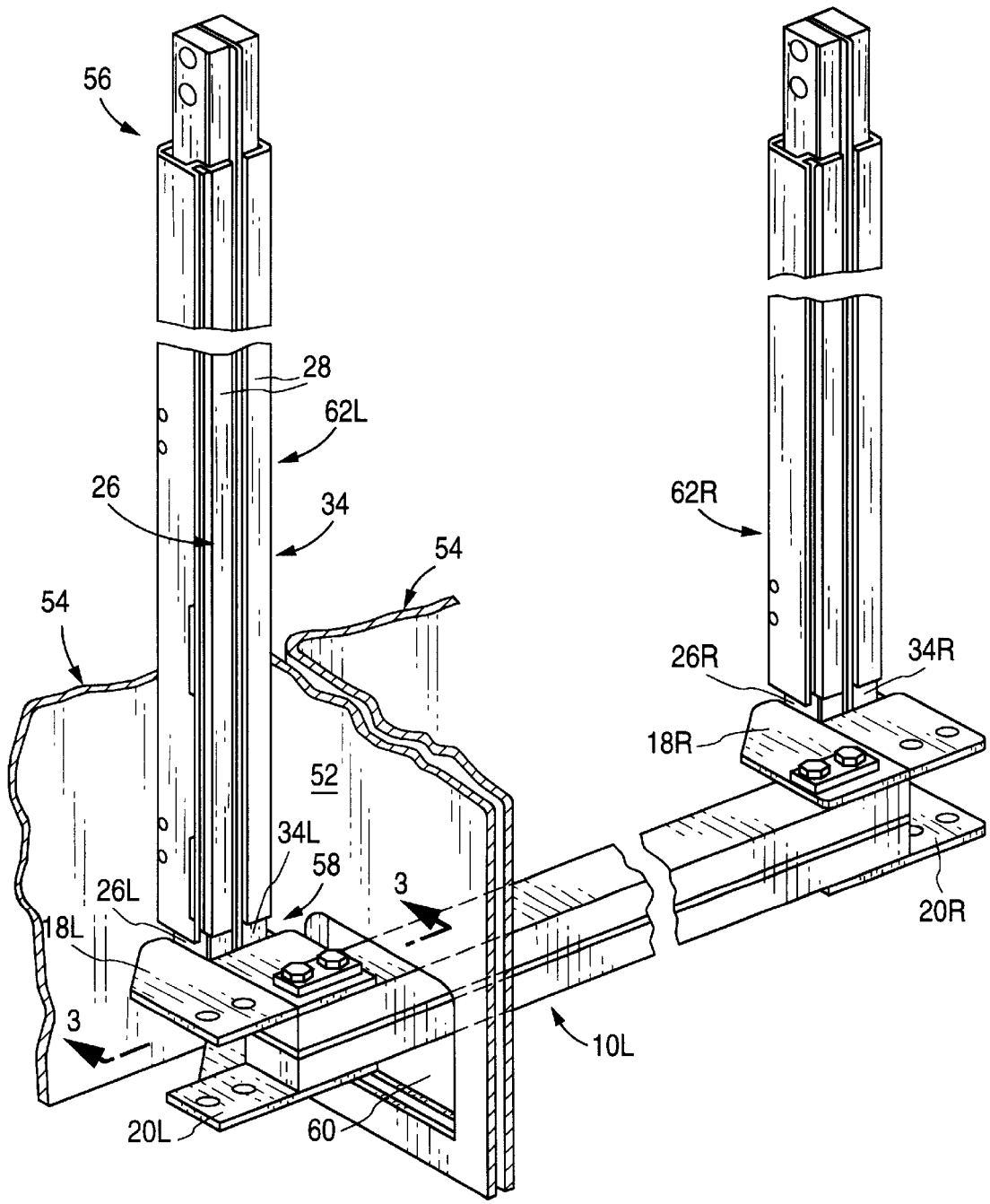
FIG. 2 is a perspective assembled view of the invention.
Figure 5A:
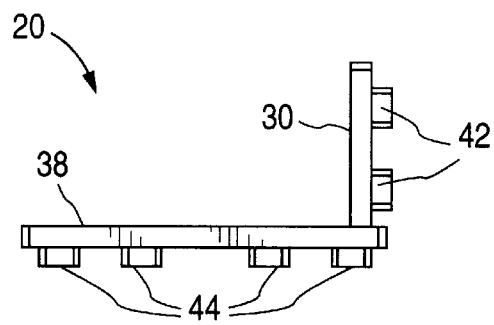
FIGS. 5a–c are front, side and top views of the lower bracket.
Figure 5B:
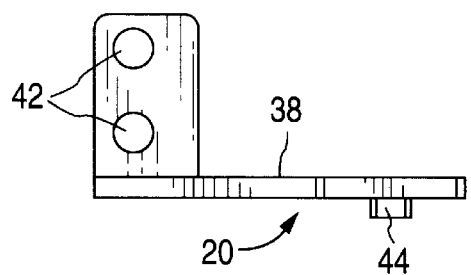
Figure 5C:
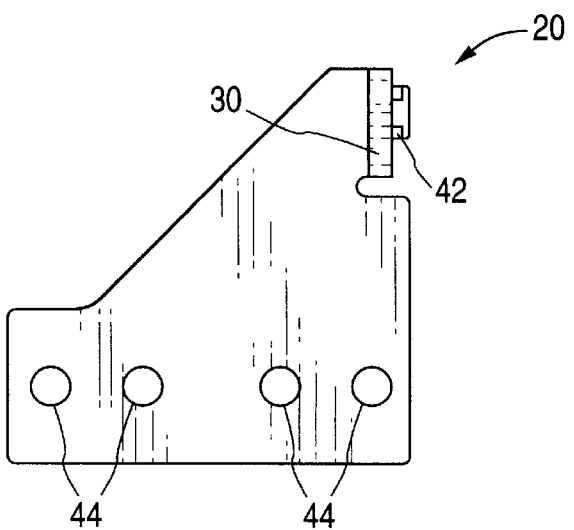

FIG. 2 shows how the parts of the exploded view of FIG. 1 are assembled. The DC buses 26, 34 are conventionally positioned vertically along the wall 52 of an equipment cabinet or bay 54 containing a plurality of rock mounted power converters or other electronic equipment (not shown). The buses 26, 34 are encased in an insulating cover 28 over most of their vertical length. At the top 56 and bottom 58 of the cabinet 54, the buses 26, 34 protrude from the cover 28 for a short distance. The cabinet 54 has an opening 60 in each lateral side at its top and bottom to accommodate the passage of the linking bus 10.

If it is desired to connect the right-hand DC bus assembly 62R and the left-hand DC bus assembly 62L in parallel, the installation proceeds as follows: First, unless they are already present from a previous installation, the brackets 18R and 20R are installed on the protruding ends of DC buses 26R and 34R in the manner described above in connection with FIG. 1. This is preferably done by first passing the insulating sleeves 46 through the ear 22 of bracket 18 and the openings 64 (FIG. 1) in DC bus 26R, inserting the bolts 40, and then installing the bracket 20 by screwing the bolts 40 into the threaded openings 42 of the ear 30 of bracket 20.

Next, brackets 18L and 20L are installed on DC buses 26L and 34L, respectively. The linking bus 10 is then passed through the opening 60 in the cabinet 54 and is slipped into the channels formed by the opposing surfaces of the brackets 18R, 20R and 18L, 20L. When so positioned, the linking bus 10 can be bolted to the brackets 18R, 20R and 18L, 20L in the manner described in connection with FIG. 1.

It will be noted in FIG. 2 that the inventive linking bus 10 can be installed either at the bottom or at the top of cabinet 54 to equally well accommodate top-cabled AC power or bottom-cabled AC power in the cabinets 54. If, however, the AC cabling permits and the openings 42, 44 are threaded, bottom mounting of the linking bus 10 is slightly easier because in this position, the heads of bolts 40 are easily accessible by ordinary nutdrivers.

FIG. 3 shows in greater detail the interconnection of the brackets 18, 20 and the linking bus 10. It will be noted that the insulating sleeves 46 need only extend through the upper bar 12, because the bolts 40 are in conducting contact with the lower bar 14 anyway when they are screwed into the openings 44 of bracket 20.

FIGS. 4*a–c* and 5*a–c* show the brackets 18 and 20 as seen from the front, left and top respectively. It will be noted that the horizontal surfaces of the brackets 18, 20 have four openings, of which only two are used in FIGS. 1 and 2. The other two, of course, are adapted to receive linking buses 10 from and to preceding and succeeding bays. As best seen in FIG. 4*a*, the left half 70 of the horizontal portion of the upper bracket 18 is very slightly inclined upwardly (by about 2.5 degrees) to facilitate slipping the linking bus 10 between the brackets 18 and 20, yet allow enough deformation to assure a firm contact between the bracket 18 and the linking bus 10 when the bolts 40 are tightened. In FIG. 4*a*, α means 90 degrees, and β means 92.5 degrees.

Although preferred and alternative embodiments of the present invention and modifications thereof have been described in detail herein, it is to be understood that this invention is not limited to those precise embodiments and modifications, and that other modifications and variations may be created by one of ordinary skill in the art without departing from the spirit and scope of the invention as defined in the appended claims.

What is claimed is:

1. A linking bus structure for connecting DC buses of adjacent power converter bays in parallel, said DC buses extending vertically side by side into a dead space at the top or bottom of each of said bays and having apertures formed therethrough, said linking bus structure comprising:

a) a first electrically conductive bracket having a substantially horizontal portion and an ear extending vertically upwardly therefrom;

b) a second electrically conductive bracket having a substantially horizontal portion and an ear extending vertically downwardly therefrom;

c) insulated fasteners passing through said apertures and said ears so as to hold said ears in electrical contact each with one of said DC buses on opposite sides thereof in such alignment as to be vertically coextensive with each other;

d) an apertured linking bus including a pair of parallel conducting bars sandwiched with an insulating layer therebetween;

e) said linking bus being slidably received between said substantially horizontal portions so that each of said bars is in electrically conductive contact with one of said brackets; and f) insulated fasteners passing through the apertures of said linking bus to hold said linking bus in contact with said brackets.

2. The structure of claim 1, in which said fasteners are insulated from one of said DC buses or bars but are in electrical contact with the other.

3. The structure of claim 2, in which said fasteners are insulated from said second bracket but are screwthreadedly received in said first bracket.

4. The structure of claim 2, in which said fasteners are bolts, and the heads of said bolts are covered with an insulating cover.

5. The structure of claim 1, in which a part of one of one of said substantially horizontal portions is slightly inclined from the horizontal so as to facilitate longitudinal sliding insertion of said linking bus between said substantially horizontal portions.

6. The structure of claim 1, in which said substantially horizontal portions are so dimensioned as to accept a pair of linking buses end to end, and to establish electrical contact therebetween.

* * * * *